Figure 2:
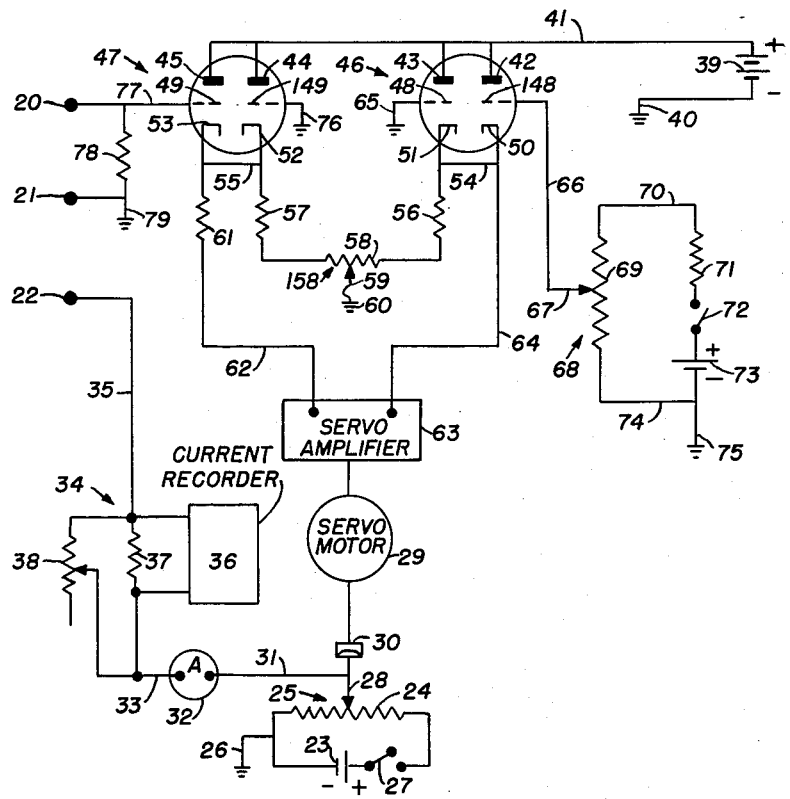

Oct. 30, 1962 L. E. ELLISON ETAL 3,061,773
APPARATUS FOR CATHODIC PROTECTION
Filed July 27, 1959 2 Sheets-Sheet 1
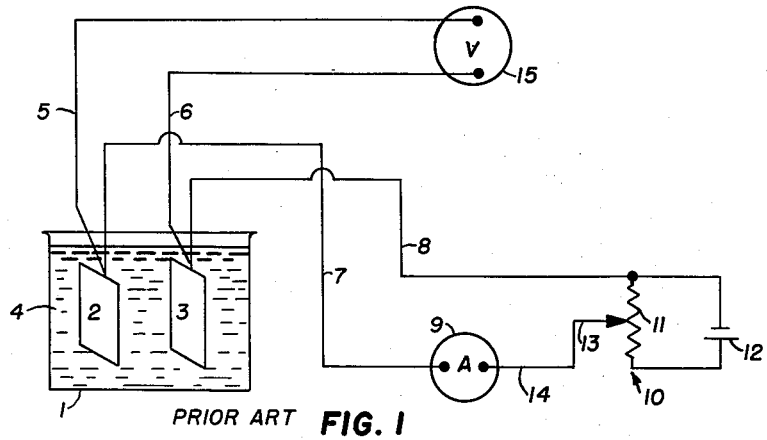
PRIOR ART FIG. 1
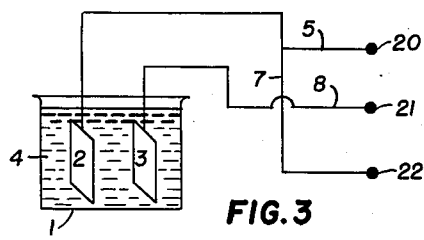
FIG. 3
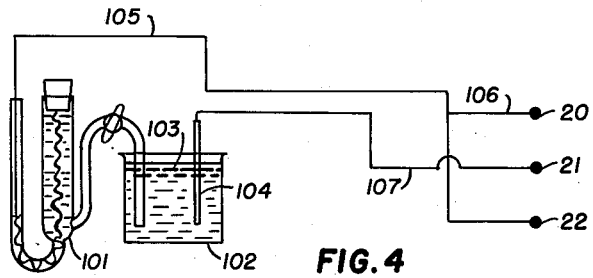
FIG. 4
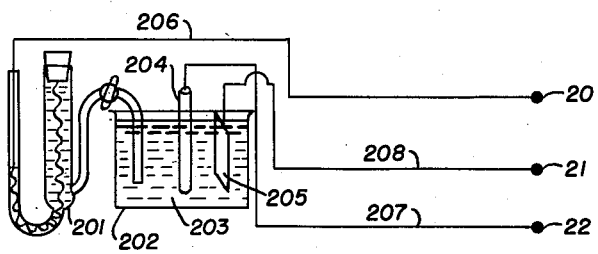
FIG. 5
INVENTORS
LYNN E. ELLISON
BY EDWARD SCHASCHL
GLENN A. MARSH
*Edward H. Fang*
ATTORNEY United States Patent Office 3,061,773
Patented Oct. 30, 1962

3,061,773
APPARATUS FOR CATHODIC PROTECTION
Lynn E. Ellison, Edward Schaschl, and Glenn A. Marsh, Crystal Lake, Ill., assignors to The Pure Oil Company, Chicago, Ill., a corporation of Ohio
Filed July 27, 1959, Ser. No. 829,862
11 Claims. (Cl. 324—30)

This invention relates to new and useful improvements in apparatus for determining and recording the current flowing through an electrolytic cell while automatically maintaining constant, at a predetermined value, the potential between the electrodes of the cell or between one of the electrodes and a reference electrode.

In protecting iron, steel, and other metal structures from corrosion considerable use has been made of the principle of cathodic protection. In cathodically protecting metals from corrosion, the metal to be protected is connected to a sacrificial anode formed of a less noble metal which creates a galvanic cell which opposes electrolytic corrosion of the protected metal. Another form of cathodic protection involves the use of an inert electrode which is connected to the structure to be protected and impressed with potential from an external power source such that the structure being protected is rendered cathodic with respect to the electrode. In both forms of cathodic protection, there has arisen a necessity for determining and recording the short-circuit current between the electrodes of the cell which is formed, and there is a further need for an instrument which will continuously record the current flowing through the cell while maintaining the potential constant.

It is therefore one object of this invention to provide a new and improved electrical apparatus for determining and recording the current flowing through an electrolytic cell while automatically maintaining the potential between the electrodes of the cell, or between one of the electrodes and a reference electrode, at a constant predetermined value.

A feature of this invention is the provision of an improved apparatus for determining and recording current flowing through an electrolytic cell, which apparatus includes a "zero-resistance" ammeter provided with a recording ammeter, and an electronic bridge circuit for maintaining a constant potential between the electrodes of the cell, or between one of the electrodes and a reference electrode.

Other objects and features of this invention will become apparent from time to time throughout the specification and claims as hereinafter related.

This invention comprises a new and improved electrical apparatus for determining and recording current flow through an electrolytic cell while automatically maintaining the potential between the electrodes of the cell, or between the electrodes and a reference electrode, at a constant predetermined level. The apparatus includes, in combination with the electrodes of the cell, an automatically adjustable "zero-resistance" ammeter which comprises a direct-current power source connected to an automatically-adjustable voltage divider, the movable contact of which is connected through a recording ammeter to one of the electrodes of the cell. The apparatus also includes an electronic bridge circuit including a pair of electron tubes in two of the legs of the bridge, one of which is connected to an electrode of the cell being measured to vary the balance of the bridge in accordance with variations in cell potential. In this apparatus, the output of the bridge circuit, which is initially balanced, is fed into a servo-amplifier which actuates a servomotor and is operable to adjust the movable contact on the voltage divider to maintain a predetermined potential of the electrode of the cell to be measured relative to ground.

In the accompanying drawings, to be taken as a part of this specification, there is clearly and fully illustrated a preferred embodiment of this invention together with an illustration of the principle upon which the invention is based and several circuits in which the invention may be used, in which drawings, FIGURE 1 is a diagrammatic view of an electrical circuit for measuring the short-circuit current between the electrodes of an electrolytic cell, FIGURE 2 is a diagrammatic view of an electrical circuit for automatically maintaining a constant potential between the electrodes of a cell and simultaneously measuring the current flowing between said electrodes, FIGURE 3 is a diagrammatic view of an electrolytic cell similar to that shown in FIG. 1, showing the points of connection to the apparatus shown in FIG. 2, FIGURE 4 is a diagrammatic view showing a cell consisting of a rotary platinum (or other inert material) electrode and a calomel half-cell, together with the points of electrical connection to the circuit shown in FIG. 2, and FIGURE 5 is a diagrammatic view of a cell comprising in combination a metal subjected to cathodic protection by an inert electrode and a calomel half-cell together with the points of electrical connection to the circuit of the apparatus shown in FIG. 2.

It is commonly known that the short-circuit current between the electrodes of an electrolytic cell cannot be determined by connecting an ammeter across the electrodes because of the inherent resistances of the lead wires and the internal resistance of the ammeter. Consequently, so-called "zero-resistance" ammeters have been developed in the prior art for measuring the short-circuit current of cells. One such apparatus is shown in FIG. 1. In FIG. 1, there is shown an electrolytic cell 1 which comprises a pair of dissimilar electrodes 2 and 3 immersed in an electrolyte 4. Electrodes 2 and 3 are connected by lead wires 5 and 6 to voltmeter 15. Electrodes 2 and 3 are also connected by lead wires 7 and 8 to ammeter 9 and to voltage divider 10, respectively. Voltage divider 10 consists of resistor 11, connected to battery 12 and having movable contact 13 connected to lead wire 14 to ammeter 9. In this arrangement the battery and voltage divider and lead wires associated therewith are connected to electrodes 2 and 3 to apply a potential in opposition to the potential of the cell. When adjustable contact 13 on voltage divider 10 is adjusted to balance the potential of the cell, voltmeter 15 will indicate a potential difference of zero volts between the electrodes. At this point the reading indicated on ammeter 9 will be the short circuit cell current.

In studying corrosion phenomena, it is frequently desirable to obtain a continuous record of changes in the current of electrolytic cells which are caused by the action of the corrosive environment on one or both of the electrodes, or by changes in the corrosive environment. The apparatus of this invention continuously and automatically adjusts the battery-applied voltage to maintain the potential difference between the cell electrodes at a predetermined constant level and continuously records the current flow through the cell. This apparatus is shown more fully in FIG. 2, and is adapted for use with a variety of cells for measurement of current flow and for maintenance of different fixed potentials which may be required for the particular cell.

Referring to FIG. 2, there is shown an electrical diagram for an apparatus which automatically records cell currents and maintains contant cell potentials. This apparatus includes a plurality of electrical connectors or terminals 20, 21, and 22, arranged for connection to appropriate points in the cell which is to be measured. There is also provided battery 23 which is connected to resistor 24 of voltage-divider 25. One side of battery 23 is connected to ground, as at 26, and the other side is provided with switch 27 in the connection to resistor 24. Voltage-divider 25 is also provided with movable contact 28 which is actuated by servomotor 29 through slipping clutch 30. Movable contact 28 is connected by lead wire 31 to ammeter 32 which provides a visual means for reading cell currents. Ammeter 32 is connected by lead wire 33 to a recording ammeter, which is generally designated 34, and which in turn is connected by lead wire 35 to connector or terminal 22 for connection to the cell to be measured. Recording ammeter 34 may be of any suitable type, and in the preferred embodiment of this invention is a #10 mv., D.C., Leeds and Northrup Model G Speedomax, indicated at 36. This instrument is actually a millivoltmeter and is connected with its terminals across resistor 37. It is also connected to rheostat 38 for adjustment of the range of the recorder. While the particular sizes of the battery, resistor, current recorder, servomotor, rheostat, etc. will vary somewhat in accordance with the particular instruments which are available commercially, the sizes of these parts which were used in the preferred embodiment of this invention are as follows: Servomotor 29 is a product of Minneapolis-Honeywell Regulator Company, Model Number 76750-3. Battery 23 is a 6-volt battery. Resistor 37 has a fixed resistance of 10 ohms so that a current flow of one milliampere will cause a full scale deflection of 10 millivolts on recorder 36. Rheostat 38 has a maximum resistance of 100 ohms and serves as an adjustable shunt, which permits expansion of the range of the recorder.

In another portion of the apparatus shown in FIG. 2, there is provided a control circuit which has a suitable source of D.C., high voltage in the form of battery 39, preferably a 105 v. "B" battery, although the current could be supplied from any suitable constant D.C. power source. Battery 39 has its negative terminal connected to ground as at 40. The positive terminal of battery 39 is connected by lead wire 41 to plates 42, 43, 44, and 45 of electron tubes 46 and 47, respectively. Tubes 46 and 47 are preferably 12AY7 triodes having plates 42, 43, 44, and 45, grids 48 and 49, and cathodes 50, 51, 52, and 53. Cathodes 50 and 51 are connected together as at 54, and cathodes 52 and 53 are connected together as at 55. Cathodes 51 and 52 are connected to resistors 56 and 57 (preferably 10,000 ohm resistors) and to resistor 58 (preferably 5,000 ohms) which has movable contact 59 connected to ground, as at 60, forming voltage-divider 158. Cathode 53 is connected to resistor 61 (preferably 68,000 ohms), and thence by lead wire 62 to one side of servo-amplifier 63. Cathode 50 is connected by lead wire 64 to the other side of servo-amplifier 63. Grid 48 in tube 46 is grounded on one side, as at 65, and grid 148 is connected by lead wire 66 to adjustable contact 67 of voltage-divider 68. Voltage-divider 68 comprises fixed resistor 69 (1000 ohms) and movable contact 67, and is connected by lead wire 70 to resistor 71 (330 ohms), switch 72, and the positive side of battery 73 (1.34 v.). Resistor 69 is connected on its other side by lead wire 74 to the negative side of battery 73, and is also connected to ground as indicated at 75. Grid 149 of tube 47 is grounded, as at 76, and grid 49 is connected by lead wire 77 to connector or terminal 20 for connection to the cell to be measured. Lead wire 77 is connected through resistor 78 (preferably 22 megohms) to ground as indicated at 79. Connector or terminal 21 is also connected to ground at point 79.

In the control circuits just described, the electron tubes and associated resistors form a detector circuit which is a Wheatstone bridge in which resistors 56, 57, and parts of resistor 58 form two of the circuit legs, and the triodes (comprising cathodes 51 and 52, grids 48 and 149, and plates 43 and 44) form the other two legs of the bridge. Servo-amplifier 63 is connected across the bridge circuit and is balanced (i.e., no potential exists between the terminals thereof) when the bridge circuit is in balance. When the bridge circuit becomes unbalanced, a potential is applied to the servo-amplifier in one direction or the other which causes the servomotor to be actuated to adjust the position of movable contact 28 on voltage-divider 25. This causes a potential change upon grid 49 which in turn causes the plate resistance of tube 47 to return to its balanced condition.

Before using the apparatus, the detector or bridge circuit must be calibrated and adjusted so that the potential difference at the connections to servo-amplifier 63 is zero when grids 48 and 49 are in balance, i.e., at the same potential with respect to ground. Voltage-divider 68 is adjusted to provide a reference potential in relation to the ground potential in an amount necessary to balance the bridge circuit. Resistor 71 is of a size (330 ohms) such that the voltage between movable contact 67 and ground can be adjusted through the range of zero to one volt by a full-scale adjustment of voltage-divider 68 (resistor 69 has a resistance of 1000 ohms). When the resistance of voltage-divider 68 is adjusted to zero, the potential is zero, and when it is adjusted to its maximum, the potential is one volt. Obviously, the provision of a greater power supply and suitable alteration of the resistances permits establishing a reference voltage greater than one volt. It is apparent then that this reference voltage is always set at zero when the apparatus is used as a zero-resistance recording ammeter, but that the provision of means for adjusting the reference potential also makes the apparatus useful in determining cell current while maintaining the potential across a cell constant at any desired level.

When the reference potential has been set, adjustable contact 59 associated with resistor 58 of voltage-divider 158 is adjusted so that the voltage at cathode 53 is the same as the voltage at cathode 50. This condition of balance is noted by the action of servomotor 29, since, when balance is attained, the motor becomes inactive. In practice, motor 29 may not be visible to the operator. Consequently, a neon signal light (not shown) is connected across the control winding of the servomotor to indicate balance or lack of balance. When cathodes 53 and 50 are in balance, the control winding of the servomotor is at a minimum voltage (about 15–25 volts). This voltage is not sufficient to cause the signal lamp to glow, since the neon lamp has a firing voltage of about 35 volts. However, when even a slight unbalance is fed into servo-amplifier 63, a potential of at least about 40 volts is imposed upon the control winding and the signal lamp, and the lamp glows to indicate unbalance. Adjustable contact 59 of voltage-divider 158 is therefore adjusted initially to extinguish the signal light. When electron tube 47 is unbalanced as a result of a change in potential resulting from a variation in the cell to which terminal 20 is connected, the bridge circuit becomes unbalanced and causes servo-amplifier 63 to actuate servomotor 29 and move contact 28 on voltage-divider 25 to adjust the potential supplied by battery 23 to terminal 22. This adjusts the potential in the cell to which the apparatus is connected, and restores tube 47 and the bridge circuit to balance.

The operation of this apparatus can be understood more clearly by consideration of the application of the apparatus to the continuous measurement of the current of an electrolytic cell of the type shown in FIG. 1. Such an arrangement is shown in FIG. 3, and included electrolytic cell 1 comprising electrodes 2 and 3, immersed in electrolyte 4 and connected by lead-wires 7 and 8 to terminals 21 and 22, and by lead-wire 5 to terminal 20. Voltage-dividers 68 and 158 were each balanced, as previously described, to bring the bridge circuit into balance relative to servo-amplifier 63 while establishing a zero potential between terminals 20 and 21, and therefore between electrodes 2 and 3. The portion of the circuit including recording ammeter 34, battery 23, and voltage-divider 25 corresponds to battery 12, voltage-divider 10, and ammeter 9 in FIG. 1. The current flowing between electrodes 2 and 3 was continuously measured and recorded by recording ammeter 34, and could be observed visually on ammeter 32. Any changes in potential which arose during the use of the instrument were automatically corrected by the control portion of the circuit. Any changes in potential caused electron tube 47 to unbalance the bridge circuit, and to actuate servo-amplifier 63 to energize servomotor 29 and move contact 28 to voltage-divider 25 to a new position to establish the required zero potential between the electrodes. In this automatic adjustment of voltage-divider 25, sliding clutch 30 protected movable contact 28 from damage when it reached the limits of its travel. In the application of the apparatus to measurement of current in a cell in the manner just described, the electrodes which were measured consisted of aluminum and steel electrodes, respectively, immersed in a 1% sodium chloride solution. The application of this apparatus to the measurement of currents in other electrolytic cells, and in making other electrochemical measurements, involves simple and obvious adjustments in the various voltage dividers.

This instrument is also useful as a meter for detecting and recording the dissolved oxygen content of an electrolytic cell, as shown in FIG. 4. In Analytical Chemistry, 23, 1427, October 1951, Marsh describes a portable meter for determining dissolved oxygen. In this publication, it is stated that the measurement of diffusion current resulting from the reduction of oxygen at a platinum electrode of a galvanic cell, consisting of a platinum electrode and a calomel half-cell, permits determination of the dissolved oxygen content in the electrolyte, since the change in diffusion current with dissolved oxygen concentration is approximately linear for any potential in the range of about −0.50 to −0.75 volt. Also, diffusion current is practically a linear function of applied potential over this range. A potential of about −0.7 volt was chosen by Marsh as about the optimum. In using the apparatus of this invention for determining dissolved oxygen concentration and changes therein, voltage-divider 68 was adjusted until a potential of −0.7 volt was established for a platinum electrode with respect to a calomel half-cell. In this application of the apparatus, there is provided calomel half-cell 101 which is connected to the other portion of a cell comprising container 102 containing electrolyte 103 and rotating platinum electrode 104. Half-cell 101 is connected by lead-wire 105 to terminal 22 and by lead-wire 106 to terminal 20. Rotating platinum electrode 104 is connected by lead-wire 107 to terminal 21. When connected in this manner, and the circuits adjusted so that a potential of −0.7 volt is maintained on platinum electrode 104 with respect to the calomel half-cell, the dissolved oxygen content in the electrolyte is proportional to the diffusion current which is indicated on and recorded by recording ammeter 34. Thus, the apparatus when connected in this manner functions as an automatically-recording, dissolved-oxygen meter.

The ability of this instrument to maintain constant the potential between two electrodes of an electrolytic cell also makes it useful in determining the effect of depositing a salt from solution in an electrolyte on to a cathodically protected steel specimen, such as shown in FIG. 5. In the particular system studied, it was desired to determine the effect of the deposition of calcium carbonate from aqueous solution under conditions that would exist in the cathodic protection of steel in sea water. In this arrangement, as shown in FIG. 5, there was provided calomel half-cell 201 which was connected to the remainder of electrolytic cell 202 consisting of a container holding electrolyte 203 and steel specimen 205, and carbon (or other inert material) electrode 204. Calomel half-cell 201 was connected by lead-wire 206 to terminal 20, carbon electrode 204 was connected by lead-wire 207 to terminal 22, and steel specimen 205 was connected by lead-wire 208 to terminal 21. In this arrangement, it was necessary to maintain the potential constant between steel specimen 205 and calomel half-cell 201 while simultaneously providing cathodic protection to the cell by introducing electrons at the surface of the steel specimen. As a scale of calcium carbonate developed on the steel specimen, less current was necessary to maintain the desired potential. By connecting the cell to terminals 20, 21, and 22 as previously described, it was possible to vary the reference potential at will and determine the degree of protection afforded at each potential with great rapidity and ease. In this arrangement, voltage-divider 68 may be adjusted to establish any desired reference potential between steel specimen 205 and calomel half-cell 201.

While we have described this invention fully and completely with reference to a preferred embodiment thereof and with an explanation of the application of the invention in a number of different environments, we wish it to be understood that within the scope of the appended claims this invention may be practiced otherwise than as specifically described.

What is claimed is:

1. An apparatus for regulating or recording the current flowing through an electrolytic cell of dissimilar materials having a cell potential which comprises a first electric circuit including a variable direct current power source, adapted for connection across the cell to be measured in opposition to the potential of said cell, and a recording ammeter operatively connected in said circuit in series with said power source and said cell, a second direct-current electric circuit including a bridge circuit with electron tubes, each having a plate, cathode, and grid operatively connected in each of two legs thereof, a servo-amplifier connected across and controlled by said bridge circuit, a third electric circuit including a variable direct current power source connected to the grid of one of said electron tubes, a fourth electric circuit adapted for connection to the cell to be measured and including the grid of another one of said electron tubes, and a servomotor operatively connected to said servo-amplifier for actuation thereby, and having a mechanical connection to the variable direct current power source in said first circuit to adjust the same to maintain a predetermined constant potential relative to the cell being measured.

2. An apparatus in accordance with claim 1 in which the cathodes of said electron tubes are connected to ground through a common variable resistor which is adjustable to balance the bridge circuit initially relative to said servo-amplifier.

3. An apparatus in accordance with claim 1 in which said electron tubes comprise a pair of tubes each having a pair of cathodes, a pair of plates, and a pair of grids connected in parallel in the respective legs of said bridge circuit.

4. An apparatus in accordance with claim 1 in which the variable direct current power source in said first circuit comprises a battery connected to a voltage-divider having a movable contact actuated by said servomotor.

5. In combination, an apparatus as defined in claim 1 and an electrolytic cell consisting of a corrodible metal and a sacrificial anode of a less noble metal, said corrodible metal being connected to ground, and said sacrificial anode being connected to said recording ammeter and through said fourth circuit to the grid of one of said electron tubes.

6. A recording meter for measuring dissolved oxygen in an electrolyte which comprises the combination with an apparatus as defined in claim 1 of an electrolytic cell consisting of a calomel half-cell and a rotary platinum electrode, said platinum electrode being connected to ground, the electrode of said calomel half-cell being connected to said fourth circuit and to said recording ammeter, and said first electric circuit being adjustable to establish a potential of −0.50 to −0.75 volt between said platinum electrode and the electrode of said half-cell, the current recorded by said recording ammeter being directly proportional to the dissolved oxygen content of the electrolyte.

7. A cathodic protection and measuring system comprising in combination a cell consisting of a corrodible metal and an inert electrode in an electrolyte, and a calomel half-cell connected to an apparatus as defined in claim 1 with the corrodible metal connected to ground, the electrode of the half-cell being connected to the grid of one of said electron tubes through said fourth circuit, and the inert electrode being connected to said recording ammeter, said first circuit being automatically adjusted to maintain a predetermined constant potential between said corrodible metal and said half-cell while measuring the current flow between said inert electrode and said corrodible metal.

8. An apparatus for regulating or recording the current flowing through an electrolytic cell of dissimilar materials having a cell potential which comprises a first electric circuit including a battery connected to a voltage-divider consisting of a resistor grounded on one side and having a variable contact connected to one side of a recording ammeter, the other side of which is arranged for connection to one side of the cell to be measured to apply a potential in opposition to the cell when the other side of the cell is grounded, a servomotor with a mechanical connection, including a slipping clutch, for adjusting the position of the movable contact of said voltage-divider, a second direct current electric circuit including a bridge circuit with electron tubes having a plate, cathode and grid in two of the legs thereof and resistors in the other two legs connected to ground through a common variable resistor, a pair of electron tubes connected in parallel with the legs of said bridge circuit containing said first-named electron tubes, and having cathodes connected to the cathodes of said first-named electron tubes, a servo-amplifier connected across said bridge circuit and operatively connected to said servomotor to actuate the same to move the variable contact of said voltage-divider in response to changes in the balance of said bridge circuit, a third circuit including a constant direct current source and a voltage-divider grounded on one side and having a movable contact operatively connected to the grids of the tubes in one leg of the bridge circuit to balance the bridge circuit, the tubes in the other legs of said bridge circuit having an electrical connection adapted to be connected to said one side of the cell to be measured, a resistor connected from said last-named electrical connection to ground, and a ground connection for connection to the other side of the cell to be measured.

9. In combination, an apparatus as defined in claim 8 and an electrolytic cell consisting of a corrodible metal and a sacrificial anode of a less noble metal, said corrodible metal being connected to said ground connector, and said sacrificial anode being connected to said recording ammeter and to the electrical connector connected to grids of the tubes in said other leg of the bridge circuit.

10. A recording meter for measuring dissolved oxygen in an electrolyte which comprises the combination with an apparatus as defined in claim 8 of an electrolytic cell consisting of a calomel half-cell and a rotary platinum electrode, said platinum electrode being connected to said ground connector, the electrode of said calomel half-cell being connected to the electrical connector connected to the grids of the tubes in said other leg of the bridge circuit and to said recording ammeter, and said first-named voltage divider being adjustable to establish a potential of −0.50 to −0.75 volt between said platinum electrode and the electrode of said half cell, the current recorded by said recording ammeter being directly proportional to the dissolved oxygen content of the electrolyte.

11. A cathodic protection and measuring system comprising in combination a cell consisting of a corrodible metal and an inert electrode in an electrolyte, and a calomel half-cell connected to an apparatus as defined in claim 8 with the corrodible metal connected to said ground connector, the electrode of said calomel half-cell being connected to the electrical connector connected to the grids of the tubes in said other leg of the bridge circuit, and the inert electrode being connected to said recording ammeter, said first-named voltage divider being automatically adjustable to maintain a predetermined constant potential between said corrodible metal and said half-cell while the recording ammeter measures the current flowing between said inert electrode and said corrodible metal.

References Cited in the file of this patent

UNITED STATES PATENTS

| | | |
|---|---|---|
| 2,404,891 | Schmitt | July 30, 1946 |
| 2,498,103 | Wojciechowski | Feb. 21, 1950 |
| 2,571,746 | Mouzon | Oct. 16, 1951 |
| 2,584,816 | Sands | Feb. 5, 1952 |
| 2,886,770 | Jackson et al. | May 12, 1959 |
| 2,949,765 | Thayer et al. | Aug. 23, 1960 |

OTHER REFERENCES

Hickling: "Transactions of Faraday Society," volume 38; 1942; pages 27–33.

Penther et al.: "Analytical Chemistry," volume 21, No. 1; 1949; pages 178—180.